United States Patent
Rayner

(10) Patent No.: US 12,095,655 B2
(45) Date of Patent: Sep. 17, 2024

(54) REDUNDANT TRANSMISSION SYSTEM

(71) Applicant: NEVION AS, Lysaker (NO)

(72) Inventor: Andrew Rayner, Felizstowe (GB)

(73) Assignee: Nevion AS (NO)

( * ) Notice: Subject to any disclaimer, the term of this patent is extended or adjusted under 35 U.S.C. 154(b) by 441 days.

(21) Appl. No.: 16/737,110

(22) Filed: Jan. 8, 2020

(65) Prior Publication Data

US 2021/0211374 A1    Jul. 8, 2021

(51) Int. Cl.
| | |
|---|---|
| H04L 45/24 | (2022.01) |
| H04L 45/745 | (2022.01) |
| H04L 49/55 | (2022.01) |
| H04L 65/65 | (2022.01) |

(52) U.S. Cl.
CPC ............ H04L 45/24 (2013.01); H04L 45/745 (2013.01); H04L 49/557 (2013.01); H04L 65/65 (2022.05); H04L 2212/00 (2013.01)

(58) Field of Classification Search
None
See application file for complete search history.

(56) References Cited

U.S. PATENT DOCUMENTS

| | | | | |
|---|---|---|---|---|
| 6,839,865 B2* | 1/2005 | Gould | ................. | H04L 67/1023 370/356 |
| 7,310,306 B1* | 12/2007 | Cheriton | ................. | H04L 45/00 370/218 |
| 8,958,486 B2* | 2/2015 | Rodriguez | ................ | H04L 1/08 375/240.27 |
| 10,581,759 B1* | 3/2020 | Kwan | .................... | H04L 49/254 |
| 10,846,225 B1* | 11/2020 | Matthews | ............. | H04L 47/805 |
| 2003/0174733 A1* | 9/2003 | Kawai | ..................... | H04L 45/00 370/498 |
| 2003/0226091 A1* | 12/2003 | Platenberg | ................ | H04L 1/22 714/776 |
| 2006/0268751 A1* | 11/2006 | Baird | .................. | H04L 12/1822 370/260 |
| 2007/0086475 A1* | 4/2007 | Clemens | ........... | H04L 29/06027 370/458 |
| 2008/0013550 A1* | 1/2008 | Yamauchi | ............... | H04L 47/10 370/400 |
| 2008/0205390 A1* | 8/2008 | Bangalore | ........... | H04L 41/5009 370/389 |
| 2010/0269005 A1* | 10/2010 | Budampati | ........... | H04L 1/1845 714/746 |
| 2012/0051231 A1* | 3/2012 | Ou | .......................... | H04L 43/10 370/248 |
| 2012/0201123 A1* | 8/2012 | Pegrum | .................. | H04L 47/34 370/355 |

(Continued)

FOREIGN PATENT DOCUMENTS

| | | |
|---|---|---|
| WO | 2013131561 A1 | 9/2013 |
| WO | 2016149094 A1 | 9/2016 |

*Primary Examiner* — Chirag G Shah
*Assistant Examiner* — Suk Jin Kang
(74) *Attorney, Agent, or Firm* — Paul D. Chancellor; Ocean Law

(57) ABSTRACT

A redundant transmission system including two transmitters with respective data paths, the transmitters including packet creators and selectors wherein one transmitter can serve as a master and alternately as a slave while the other transmitter serves to maintain among the two transmitters one master and one slave.

4 Claims, 10 Drawing Sheets

(56) References Cited

U.S. PATENT DOCUMENTS

| | | | | |
|---|---|---|---|---|
| 2013/0132789 A1* | 5/2013 | Watford | ............... | H04L 1/08 |
| | | | | 714/752 |
| 2013/0266005 A1* | 10/2013 | Pegrum | ............... | H04L 45/24 |
| | | | | 370/355 |
| 2014/0119193 A1* | 5/2014 | Anand | ............... | H04L 45/28 |
| | | | | 370/237 |
| 2015/0026542 A1* | 1/2015 | Brennum | ............... | H04L 65/605 |
| | | | | 714/776 |
| 2015/0333793 A1* | 11/2015 | Rentschler | ............... | H04B 1/74 |
| | | | | 370/228 |
| 2016/0277473 A1* | 9/2016 | Botsford | ............... | H04N 21/2381 |
| 2017/0063684 A1* | 3/2017 | Stokking | ............... | H04L 65/765 |
| 2018/0069908 A1* | 3/2018 | Buchanan | ............... | H04L 47/80 |
| 2019/0387035 A1* | 12/2019 | Lee | ............... | H04L 65/602 |
| 2019/0394518 A1* | 12/2019 | Martel | ............... | H04L 65/80 |
| 2020/0067629 A1* | 2/2020 | Xiong | ............... | H04L 1/0009 |
| 2020/0280749 A1* | 9/2020 | Nakamura | ............... | H04N 21/4305 |
| 2020/0280750 A1* | 9/2020 | Nakamura | ............... | H04L 65/608 |
| 2021/0091885 A1* | 3/2021 | Yu | ............... | H04L 29/04 |
| 2023/0032318 A1* | 2/2023 | Buchanan | ............... | H04L 69/22 |

\* cited by examiner

FIG. 2D

200D
Overview of IP packet

| PAYLOAD 1300 | RTP header 1302<br>includes<br>- sequence number 1303<br>- source identifier 1304 | IP + MAC header 1306<br>includes<br>- IP address 1307<br>- MAC address 1309 |
|---|---|---|

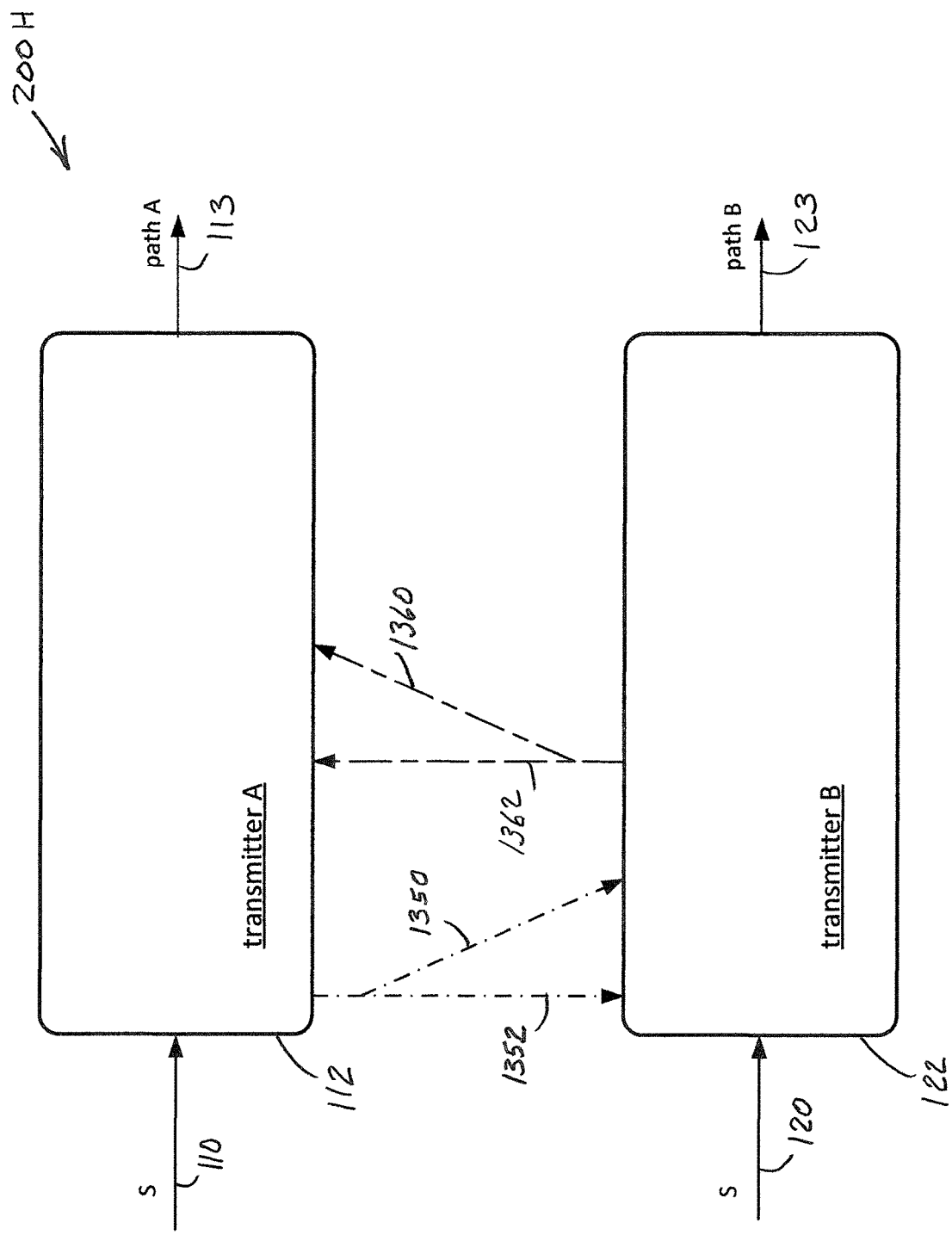

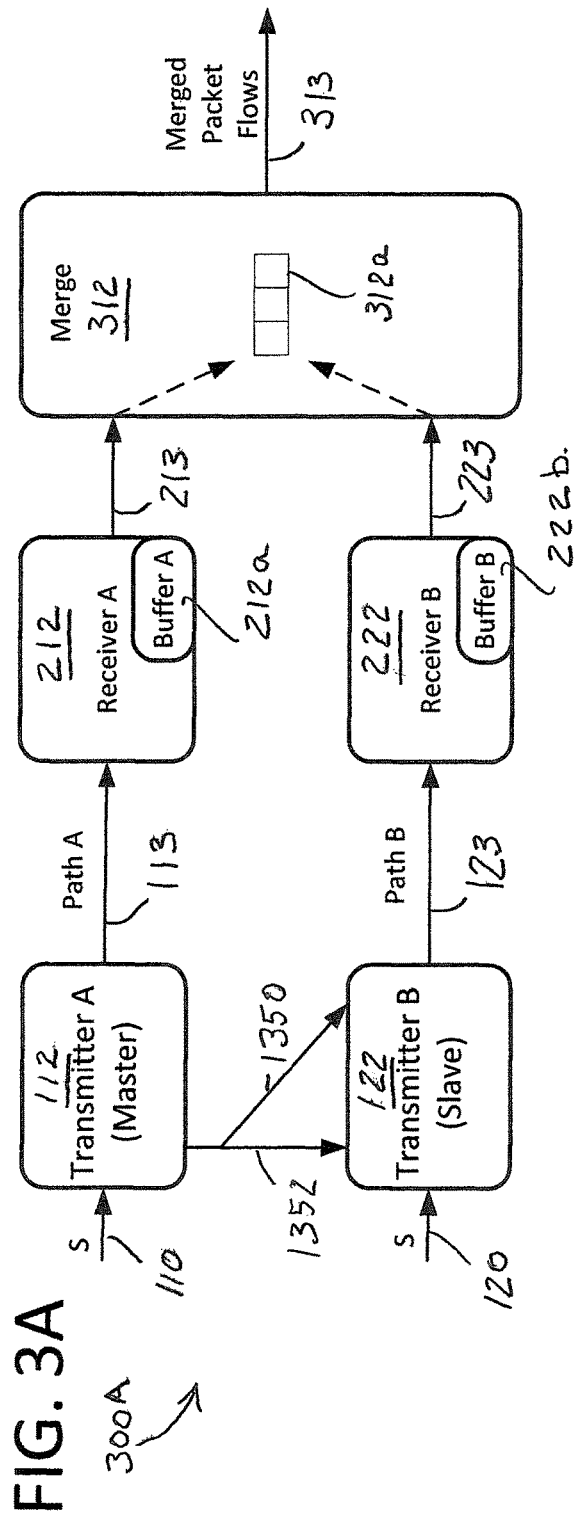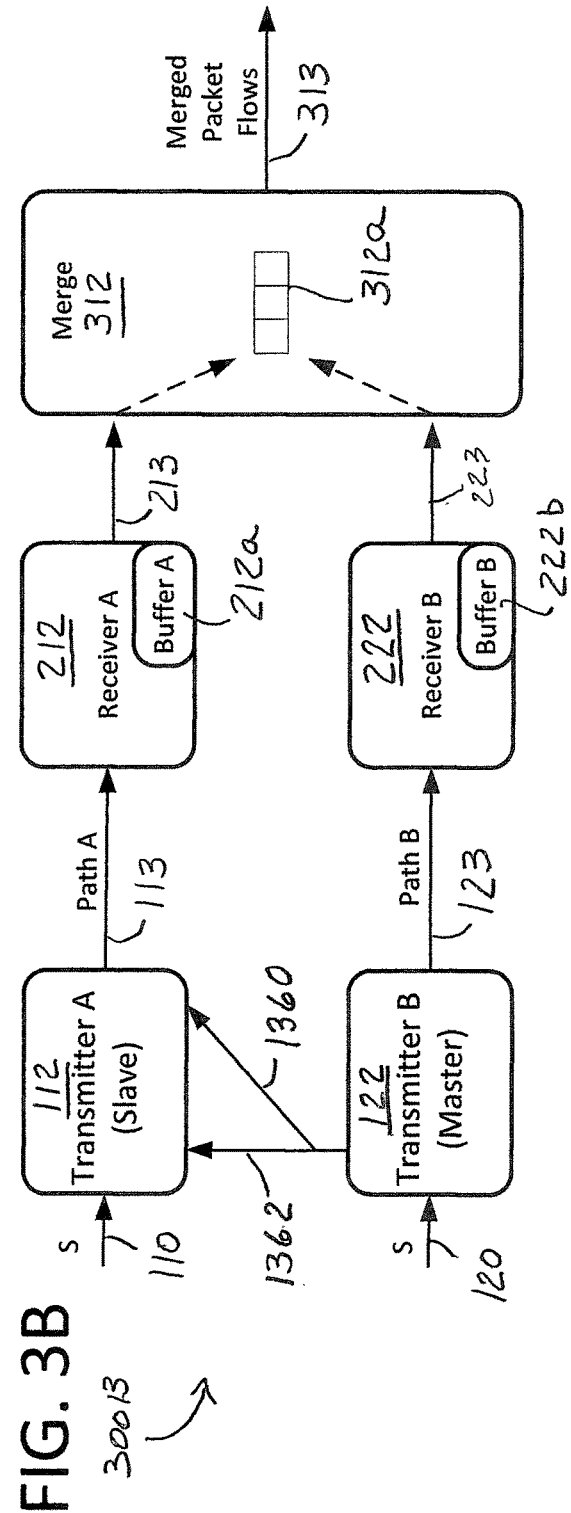

REDUNDANT TRANSMISSION SYSTEM

BACKGROUND OF THE INVENTION

High availability and error checking/correcting systems for transporting digital signals may utilize one or more of coded transmissions, redundant transmitters, redundant data paths, and redundant receivers. When dual data paths are used to transmit the same data from different transmitters, the issue of data coherence or synchronization at the receiver (s) must in cases be addressed.

FIELD OF INVENTION

This invention relates to the electrical and signal processing arts. In particular, the invention provides a system and method for redundant transmission of digital signals.

DISCUSSION OF THE RELATED ART

Systems having duplicate colocated transmitters and respective data paths leading to one or more colocated receivers can ensure data integrity by relying on error free data from one transmitter while avoiding reliance on erroneous data from the other transmitter. Receiver(s) associated with selecting and forwarding an error free data stream may manipulate the data stream(s) to resolve timing issues, for example by buffering data to align data streams.

SUMMARY OF THE INVENTION

The present invention provides a redundant transmission system and a redundant transmission system method including redundant transmitters and redundant data paths.

In an embodiment, a redundant transmission system comprises: in transmitter A, packet creator A receiving signal S and sending packets to selector A; in transmitter B, packet creator B receiving signal S and sending packets to selector B; selector A and B outputs connected to respective paths A and B; the sequence numbers of A and B packets are synchronized; in one of the transmitters, the selector passing packets created by the one transmitter; in the other of the transmitters, the selector passing packets from the one transmitter after they are modified; wherein received path A and received path B are merged after bad packets are removed, the merger of corresponding good packets resulting in a good packet overwriting a good packet.

In an embodiment, the redundant transmission system of wherein: if the transmitters are communicating then a bad packet causes the one transmitter to become the other transmitter; and, the bad packet causes the other transmitter to become the one transmitter.

In an embodiment, the redundant transmission system further comprising: if the transmitters are communicating then transmitter A working as the master transmitter and transmitter B working as the slave transmitter; a payload, RTP header, and IP+MAC header in the packets sent to selector A; transmitter A packets transported over path A; and, path B transporting modified A packets, the modified A packets having their IP and MAC headers overwritten with packet B IP and MAC headers.

In an embodiment, the redundant transmission system further comprising: if the transmitters are communicating then a transmitter B RTP sequence number synchronizer receiving a sequence number from an A packet; a B packet corresponding to the A packet adopting the A packet sequence number; and, transmitter B packets ready for transport on path B in the event that transmitter B becomes the master transmitter.

BRIEF DESCRIPTION OF THE DRAWINGS

The present invention is described with reference to the accompanying figures. The figures, incorporated herein and forming part of the specification, illustrate the present invention and, together with the description, further serve to explain the principles of the invention and to enable a person skilled in the relevant art to make and use the invention.

FIG. 2D shows an exemplary IP packet for use with the redundant transmission system of FIG. 1.

FIGS. 2G and 2H show embodiments similar to FIG. 2F further including synchronization.

FIG. 3A shows a redundant transmission system and its merge function with transmitter A working as master transmitter and transmitter B working as slave transmitter.

FIG. 3B shows a redundant transmission system and its merge function with transmitter B working as the master transmitter and transmitter A working as slave transmitter.

DETAILED DESCRIPTION OF THE PREFERRED EMBODIMENTS

The disclosure provided in the following pages describes examples of some embodiments of the invention. The designs, figures, and descriptions are non-limiting examples of certain embodiments of the invention. For example, other embodiments of the disclosed device may or may not include one or more of the features described herein. Moreover, one or more disclosed advantages and benefits may apply to only certain embodiments of the invention and should not be used to limit the disclosed inventions.

Where parts are connected, descriptions herein using the words "coupled," "connected," "interconnected" and the like refer to either direct or indirect connections. Direct connections provide for a first part connected directly to a second part, for example A connected directly to B. Indirect connections provide for a first part connected indirectly to a second part, for example A connected indirectly to C via B.

Figure 1:
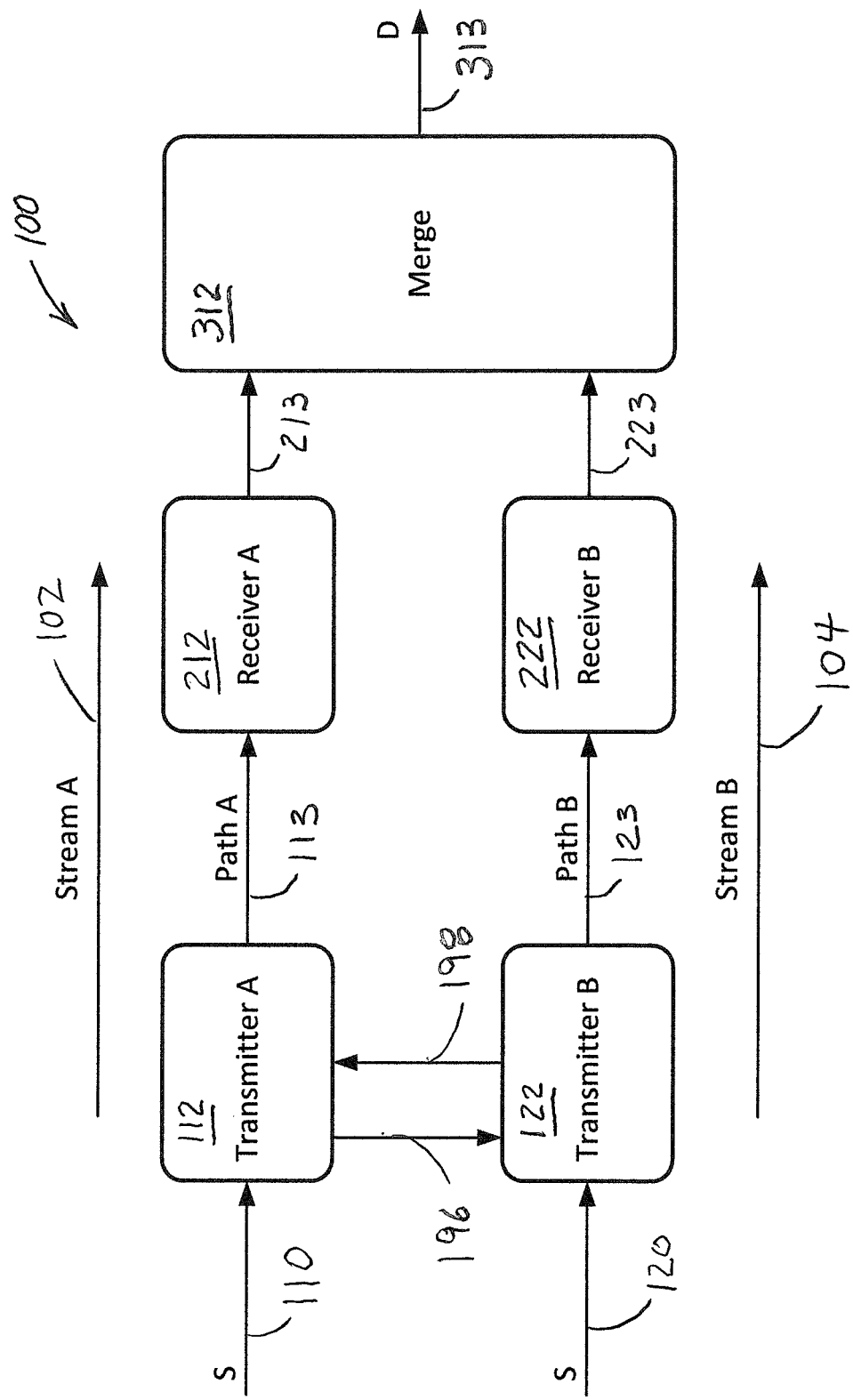
FIG. 1 shows a redundant transmission system in accordance with the present invention.

FIG. 1 shows some components of a redundant transmission system 100. In the figure, a common source S provides an input 110 to transmitter A 112 and an input 120 to transmitter B 122. Where the source S is common to both transmitters, the data provided to transmitters A and B is coherent. Links between the transmitters 196, 198 provide a means for intertransmitter communication such as intertransmitter communication for duplicating headers and/or for synchronizing packet sequence numbers. In various embodiments these links is to share the data flows between transmitters 112, 122 for proxy transmission.

Transmitter A 112 is connected to receiver A 212 via data path A 113 such that data derived from source S 110 [such as via proxy from source S 120] is communicated to the receiver A 212. Transmitter B 122 is connected to receiver B 222 via data path B 123 such that data derived from source S 120 [such as via proxy from S 110] is communicated to receiver B 222. As such, data stream A 102 passes through transmitter A 112, path A 113, and receiver A 212 to receiver A output 213. Similarly, data stream B 104 passes through transmitter B 122, path B 123, and receiver B 222 to receiver B output 223.

A merge engine 312 receives the data output 213 of receiver A 212 and the data output 223 of receiver B 222 or a facsimile thereof. Data from these sources is merged. For example, within the merge engine, the data streams may be merged to provide a merge engine output D 313 that is a correct representation of input data S to the extent that either of receiver A 212 receiver B 222 provided a correct representation of input data S. For example, the merge engine may implement a merge according to SMPTE 2022-7 Seamless Protection Switching.

Operation of transmitter A 112 and transmitter B 122 may require that one of the transmitters be a master transmitter and that the other of the transmitters be a slave transmitter. In various embodiments, a master transmitter transmission is passed to a first receiver and in various embodiments a slave transmitter disregards its input and passes instead, to a second receiver, a transmission derived from the master transmission.

Figure 2A:
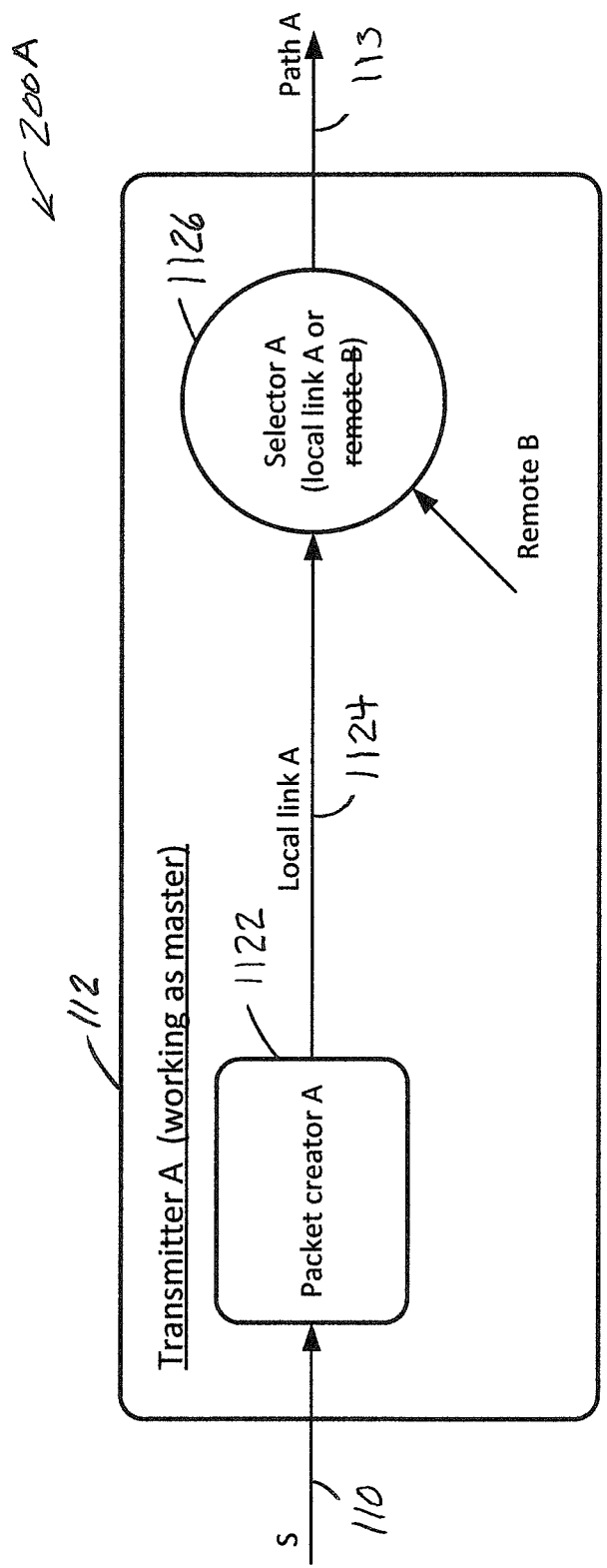
FIG. 2A shows transmitter A working as master for use with the redundant transmission system of FIG. 1.

FIG. 2A shows an embodiment where transmitter A is working as the master 200A. In transmitter A 112, packets produced from packet creator A 1122 from an S input 110 are transported to selector A 1126 via local link A 1124. At selector A, packets from local link A or from remote B are selected and forwarded to Path A 113. Where transmitter A is the master, the selector forwards local link A packets. Further, where transmitter A is the master, remote B is not selected.

Figure 2B:
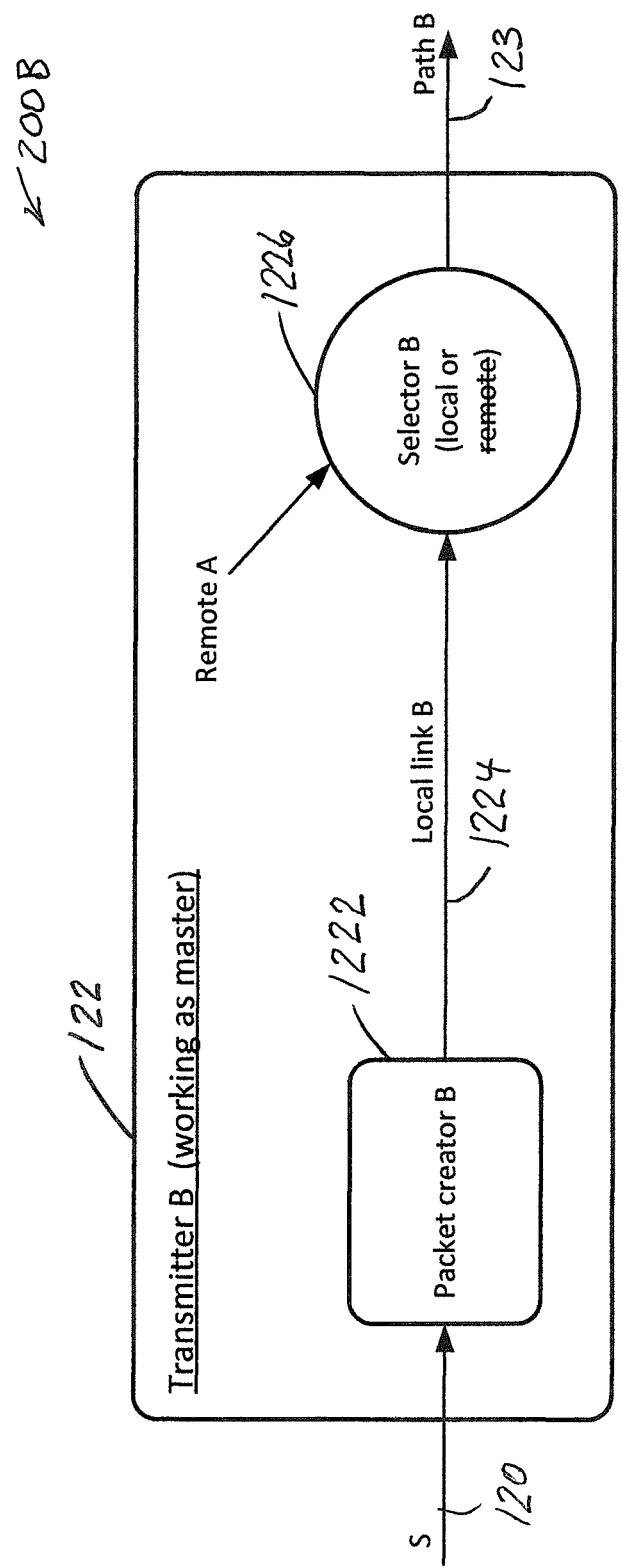
FIG. 2B shows transmitter B working as master for use with the redundant transmission system of FIG. 1.

FIG. 2B shows an embodiment where transmitter B is working as the master 200B. This is a bi-stable alternative to FIG. 2A where transmitter A 112 is master and transmitter B 122 is slave. Here, packets produced from the packet creator B 1222 from an S input 120 are transported to selector B 1226 via local link B 1224. At selector B, packets from local link B or from remote A are selected and forwarded to Path B 123. Where transmitter B is the master, the selector forwards local link B packets. Further, where transmitter B is the master, remote A is not selected.

Figure 2C:
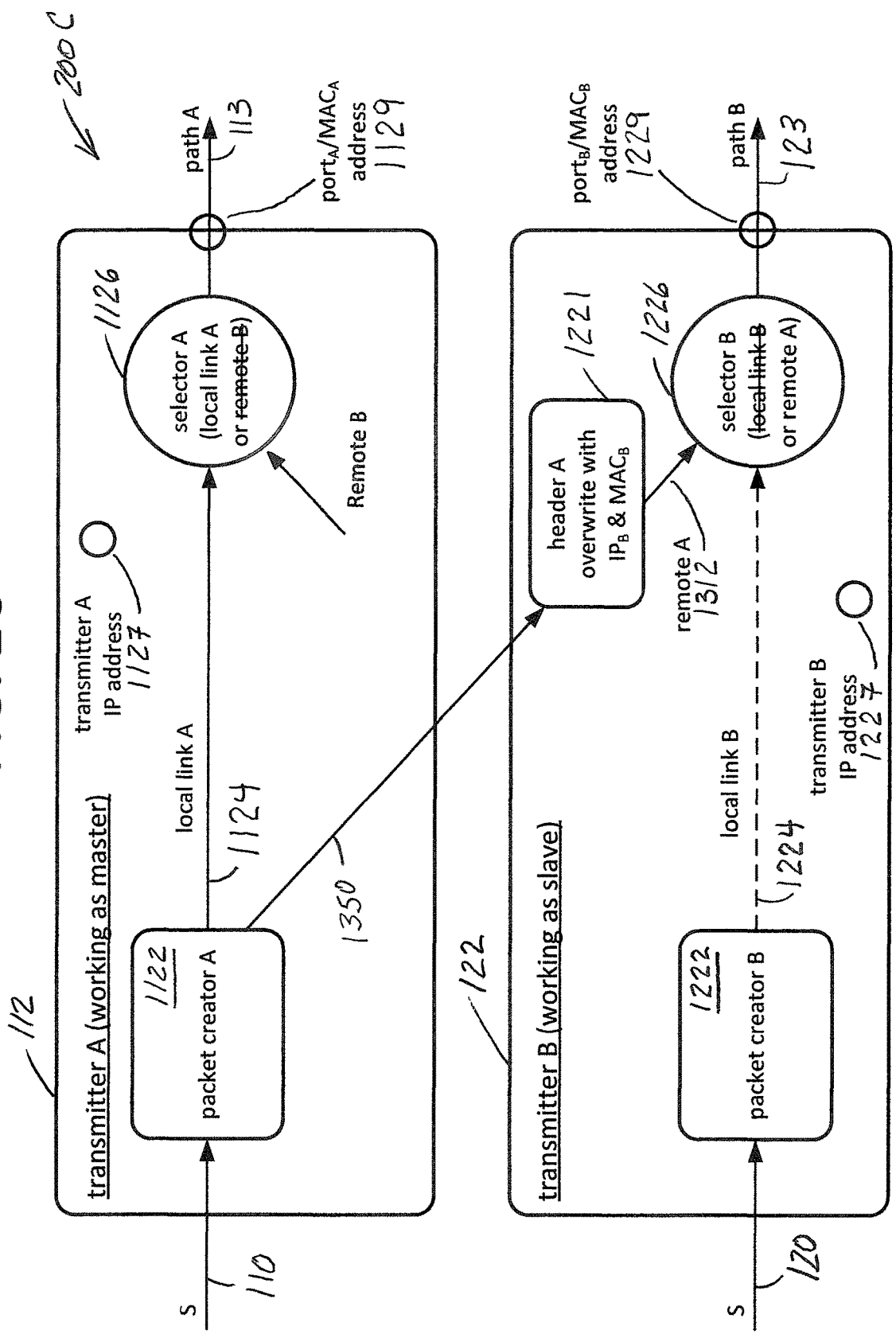
FIG. 2C shows transmitters A working as master and transmitter B working as slave with selector A set to local and header A overwrite, the transmitters for use with the redundant transmission system of FIG. 1.
Figure 2E:
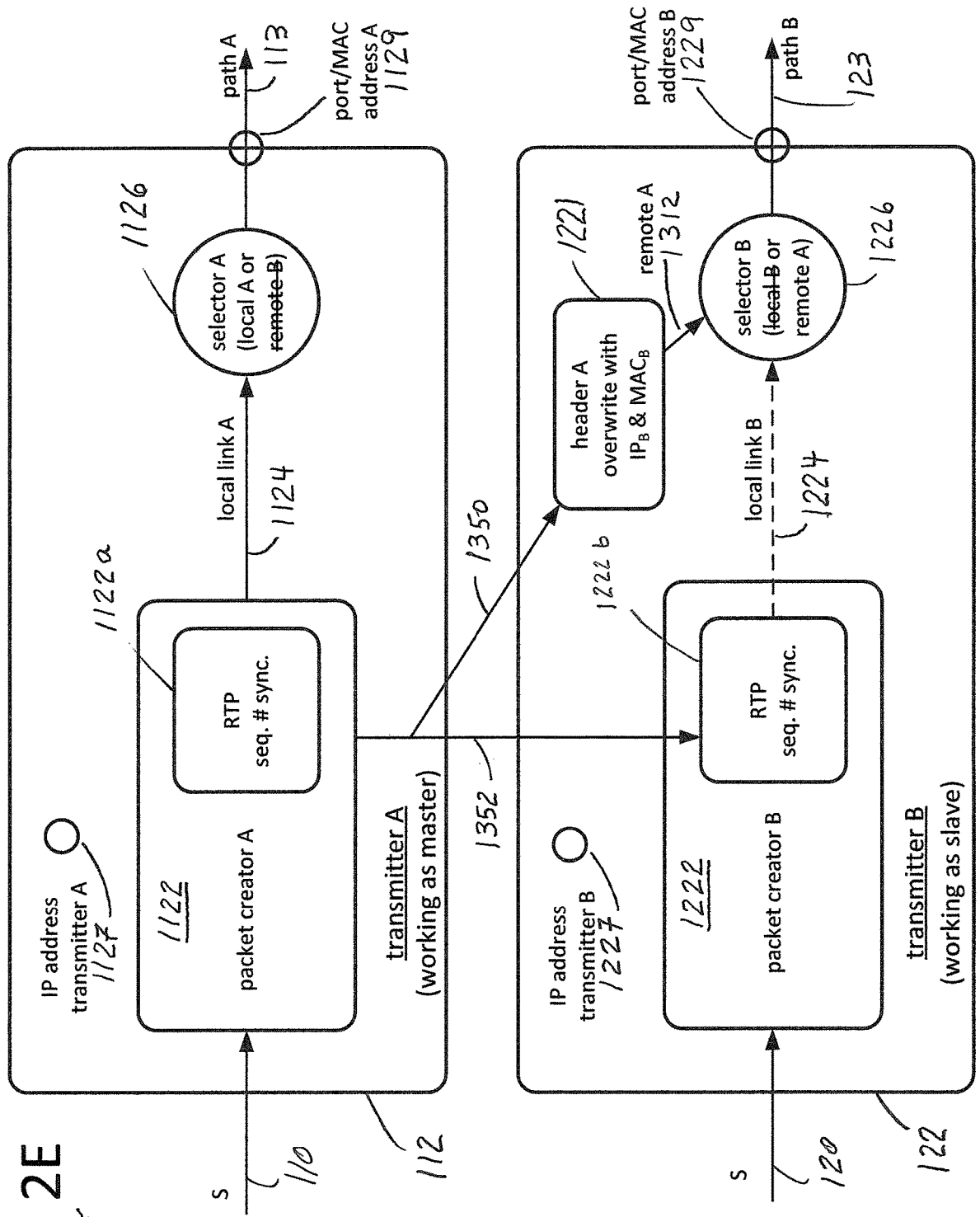
FIG. 2E shows an embodiment similar to FIG. 2C further including synchronization.

FIGS. 2C, 2E show an embodiment 200C, 200E where transmitter A 112 is the master transmitter and transmitter B 122 is the slave transmitter. In FIG. 2C selector A 1126 selects local link A 1124 and selector B 1226 selects remote A 1312. Data input S such as payload data arrives at input 110 of packet creator 1122. Within the packet creator 1122 header(s) are appended to the payload. Further, data input S such as payload data arrives at input 120 of packet creator 1222.

FIG. 2D shows exemplary packets 200D created by packet creators 1122, 1222 and output on local links A and B 1124, 1224. Here, the packet includes a payload 1300, an RTP header 1302 and an IP+MAC header 1306. The RTP header may include a sequence number 1303 and a source identifier 1304. In some embodiments the source identifier is the SSRC (multiple synchronization sources) within the RTP header. The IP+MAC header may include a port MAC address 1309 and a transmitter IP address 1307.

Referring to FIG. 2C packet creator A 1122 output on local link A 1124 is transported to selector A 1126. Data derived from packet creator B termed "remote B" may also be available at selector A. As mentioned, when transmitter A 112 is the master, selector A passes data from local link A 1124 to path A 113.

Having described how data reaches path A 113, we now describe path B data and how that data reaches path B 123. Path B data may be described as packets having payloads and RTP headers identical to those of Path A.

Path B 123 data is supplied by data derived from packet creator A 1122. As shown, packet creator A supplies data to local link A and to a first cross link 1350. The cross link is coupled to an overwrite block 1221. For each packet passed through this block, the MAC and IP address 1129, 1127 associated with transmitter A is replaced by the MAC and IP address 1229, 1227 associated with transmitter B. Notably, this overwrite of MAC and IP addresses may not affect a packet's payload or RTP header.

Packets or facsimiles thereof leaving the overwrite block 1221 are remote A packets 1312 transported to selector B 1226. As mentioned, when transmitter A 112 is the master, selector B 1226 passes data from remote A to path B 123. At this point, packets transported by data path A 113 and data path B 123 may have identical payloads and identical RTP headers.

FIG. 2E shows transmitter A as the master as in FIG. 2C and includes sequence number synchronization 200E. Here, packet(s) from packet creator A 1122 or information derived from these packet(s) may be transferred 1352 to an RTP sequence number synchronizer 1222b. In the synchronizer, the sequence numbers of corresponding packet(s) are synchronized when the sequence number of packets generated by packet creator A 1122 (packet A) are copied to packets generated by packet creator B 1222 (packet B).

Whether this transfer occurs once, periodically, or continuously, its purpose is to synchronize sequence numbers. In an embodiment, transmitter B 122 is periodically synchronizing its RTP sequence number counter with the sequence number flow received from transmitter A 112.

Synchronized packets from packet creator B 1222 or from the RTP sequence number synchronizer 1222b of transmitter B may be readied for selection and passage through selector B 1126 via local link B 1224. Notably, this readiness may aid in providing a "bumpless" or "near bumpless" transfer from transmitter A 112 as a master to transmitter B 122 as a master.

For example, when the same signal S is input to packet creators A 1122 and B 1222, packets A and B created from this signal may have different sequence numbers (or identifiers). This may frustrate their merger following transport on paths A 113 and B 123. Synchronizing the sequence numbers of corresponding packets A and B can resolve this problem.

Figure 2F:
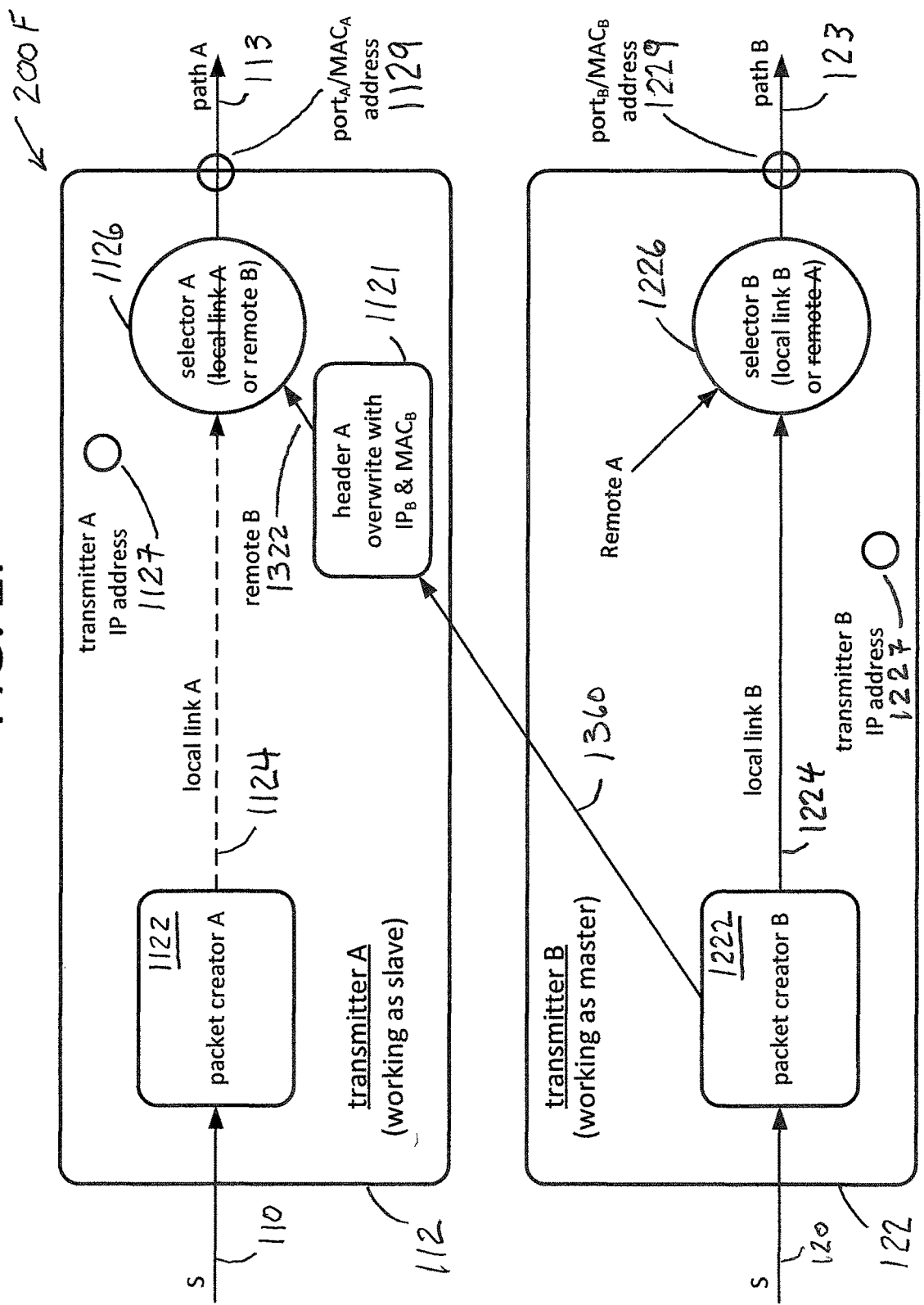
FIG. 2F shows transmitter B working as master and transmitter A working as slave with selector B set to local and header B overwrite, the transmitters for use with the redundant transmission system of FIG. 1.
Figure 2G:
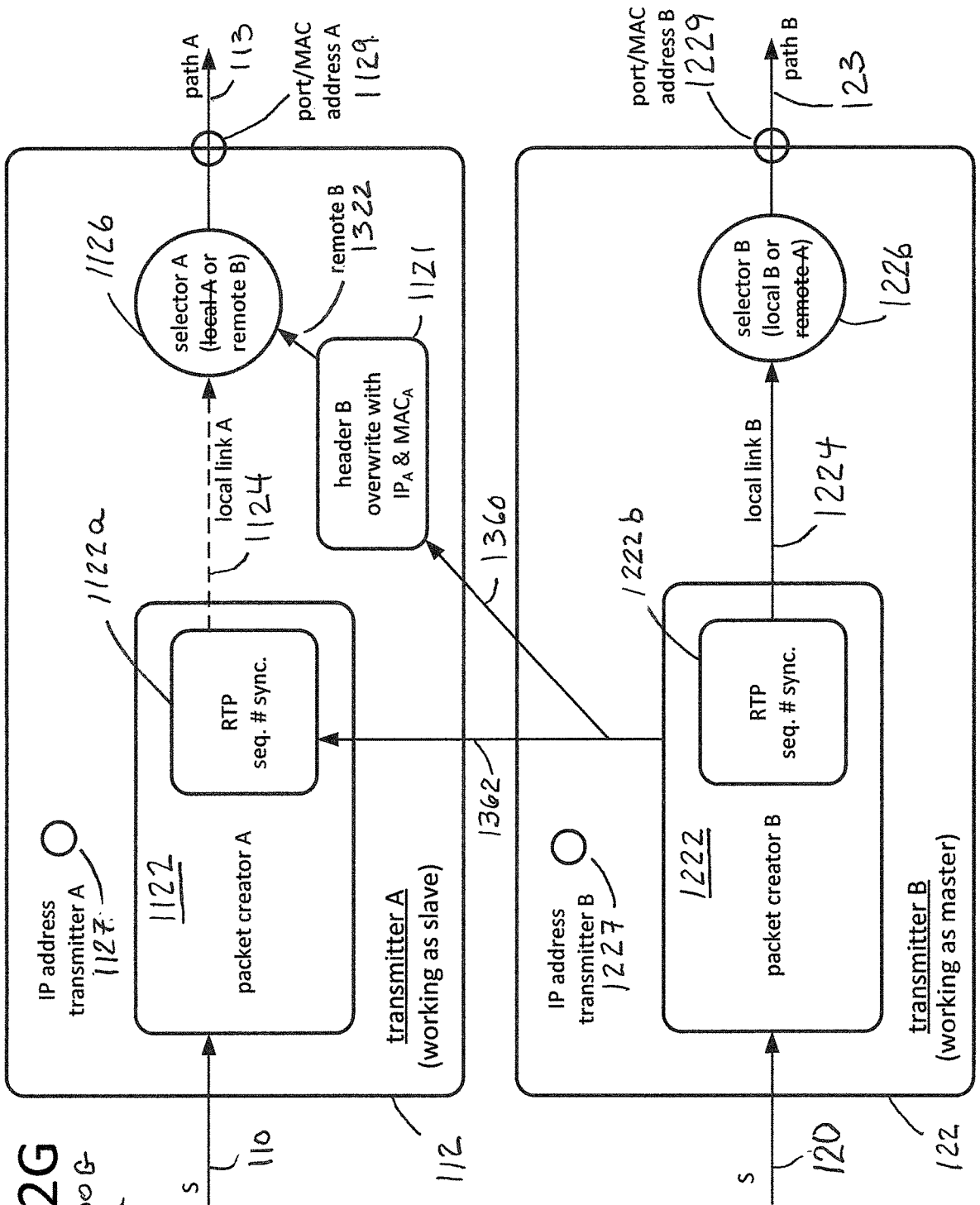

FIGS. 2F-G show a configuration 200F, 200G where transmitter B 122 is the master transmitter. In FIG. 2F, selector A 1126 selects remote link B 1322 and selector B 1226 selects local link B 1224. Data input S such as payload data arrives at the input 120 of packet creator B 1222. Within the packet creator 1222, header(s) are appended to the payload.

For example, packets similar to the packets 200D of FIG. 2D may be created by packet creators 1122, 1222 and output on local links A and B 1124, 1224. Here, a payload 1300, RTP header 1302 and IP+MAC header 1306 are included.

The RTP header may include a sequence number 1303 and a source identifier 1304. The IP+MAC header may include a port MAC address 1309 and a transmitter IP address 1307.

Referring to FIG. 2F, packet creator B 1222 output on local link B 1224 is transported to selector B 1226. Data from packet creator A termed "remote A" may also be available at selector B. As mentioned, when transmitter B 122 is the master, selector B passes data from local link B 1224 to path B 123.

Having described how data reaches path B 123, we now describe path A data and how that data reaches path A 113. Path A data may be described as packets having payloads and/or RTP headers identical to those of Path B.

Further, path A 113 data is supplied by packet creator B 1222. As shown, packet creator B supplies the same data to local link B 1224 and to a second cross link 1360. The cross link is connected to an overwrite block 1121. For each packet that is passed through this block, the MAC and IP address 1229, 1227 associated with transmitter B are replaced by the MAC and IP address 1129, 1127 associated with transmitter A. Notable, this overwrite of MAC and IP addresses may not affect a packet's payload or RTP header.

Packets leaving the overwrite block 1121 are remote B packets 1322 transported to selector A 1126. As mentioned, when transmitter B 122 is the master, selector A passes data from remote B to path A 113. At this point, packets transported by data path B 123 and data path A 113 have identical payloads and identical RTP headers.

FIG. 2G shows transmitter B 122 as the master as in FIG. 2F and includes sequence number synchronization 200G. Here, packet(s) from packet creator B 1222, or information derived from these packet(s), may be transferred 1362 to an RTP sequence number synchronizer 1122a of packet creator A. In the synchronizer, the sequence numbers of corresponding packet(s) are synchronized when the sequence number of packet B is copied to corresponding packet A.

Whether this transfer occurs once, periodically, or continuously, its purpose is to synchronize sequence numbers. In an embodiment, transmitter A 112 is periodically synchronizing its RTP sequence number counter with the sequence number flow received from transmitter B.

Synchronized packets from packet creator A 1122 or from the RTP sequence number synchronizer 1122a of transmitter A may be readied for selection and passage through selector A 1126 via local link A 1124. Notably, this readiness may aid in providing a "bumpless" or "near bumpless" transfer from transmitter B 122 as a master to transmitter A 112 as a master.

For example, when the same signal S is input 110, 120 to packet creators A 1122 and B 1222, packets A and B created from this signal may have different sequence numbers (or identifiers). This may frustrate their merger following transport on paths A and B. Synchronizing the sequence numbers of corresponding packets A 113 and B 123 can resolve this problem.

FIG. 2H shows intertransmitter communications during a bistable mode of operation 200H.

See for example FIG. 2E which shows transmitter A 112 as master and within transmitter A 112 signal passage via local link A 1124 and selector A 1126. Here, intertransmitter communications include 1) communications via first crosslink 1350 connecting packet creator A 1122 to header A overwrite 1221 such that the remote A signal 1312 is passed by selector B 1226 and 2) communications via link 1352 for synchronizing sequence numbers in transmitter B 122.

In a ready mode where the master may shift from transmitter A 112 to transmitter B 122, second crosslink 1360 may be operating in a manner similar to crosslink 1350, but selector A 1126 may disregard the remote B signal 1322. In the same ready mode, link 1362 may also operate in a manner similar to link 1352, but sequence number synchronization in transmitter A may be unaffected.

See for example FIG. 2G shows transmitter B 122 as master and within transmitter B 122 passage of local link B 1224 and selector B 1226. Here, intertransmitter communications may include any of 1) communications via first crosslink 1360 connecting packet creator B 1222 to header B overwrite 1121 such that the remote B signal 1322 is passed by selector A 1126 and 2) communications via link 1362 for synchronizing sequence numbers in transmitter A 112.

In another ready mode where the master may shift from transmitter B 122 to transmitter A 112, first crosslink 1350 may be operating in a manner similar to crosslink 1360, but selector B 1226 disregards the remote A signal 1312. In the same ready mode, link 1352 may also operate in a manner similar to link 1362, but sequence number synchronization in transmitter B may be unaffected.

FIGS. 3A-B show redundant transmission systems 300A, 300B. In FIG. A, transmitter A is master. In FIG. B, transmitter B is master.

In FIG. 3A, signal S is sent 110 to master transmitter A 112 which forwards packets to receiver A 212 via path A 113. Signal S is also sent 120 to transmitter B 122. A link 1350 provides intertransmitter communications for overwriting packet B headers with packet A information. This means packets traveling along path B 123 will have a payload copied from packet A and a header that indicates transmitter B 122 created the packets.

A link 1352 provides intertransmitter communications for synchronizing the sequence numbers of corresponding packets. This link provides that packets created by transmitter B 122 will be ready for use should transmitter B become the master.

Receiver A 212 and receiver B 222 receive packets from path A 113 and from path B 123 respectively. Because corresponding packets may be received at different times by receivers A and B, for example due to path length differences, the receivers are equipped with buffers A 212a and B 222b that may enable alignment of corresponding packets in time.

Aligned packets A and B are transferred over respective links 213 and 223 and are inputs to a merge engine 312. In the merge engine, packets that include a faithful reproduction of the payload are selected for merge engine output such that a single reproduction of each payload is output.

A merge engine memory block 312a may be used in the merge process. Here, the merge engine 312 receives packets from receivers A 212 and B 222. In the merge engine, corresponding packets may be merged when one packet is written to the memory block and the other packet overwrites this memory block. For example, packets created by the master transmitter may be the overwriting or the overwritten packets. Output 313 from the memory block 312a is therefore a merger of the output 213, 223 of the receivers 212, 222.

In a case where one of the receiver outputs 213, 223 is not a faithful reproduction of the payload S or payload portion, it may be a faulty packet. In cases, one or both of a packet with a faulty payload or an otherwise faulty packet may be a bad packet. Bad packets are not merged. Rather, the bad packet may be skipped. Where a packet is skipped, the sequence number may be used to maintain proper alignment of corresponding packets. Notably, packets that are not bad may be treated as "good" packets.

In some cases where there is failure of one or both of the intercommunications links 196, 198 between transmitters, both transmitters A 112 and B 122 may work as master transmitters. Notably, these transmitters feed respective receivers 212, 222 non-coherent data streams 113, 123. Here, the merge engine 312 must work in a select mode to pass either the transmitter A stream 102 or the transmitter B stream 104.

In some embodiments, the SSRC field of the RTP header provides the merge engine with a merge mode or select mode indicator. For example, where the SSRC field from transmitter A matches the SSRC field from transmitter B, the merge engine uses a merge mode. For example, where the SSRC field from transmitter A does not match the SSRC field from transmitter B, the merge engine uses a select mode.

In some cases one or both of the intercommunications links 1352/1362, 1350/1360 or link functions are lost. Where synchronization of sequence numbers via links 1352/1362 is lost, transmitter B 122 may not be ready to take over mastering from transmitter A 112. If transmitter B is not ready to take over mastering from transmitter A, the merge engine 312 may pass only A packets, for example by sending only A packets through memory block 312a.

And, where header overwrite of A packets via links 1350/1360 is lost, transmitter B 122 may stop working. If transmitter B 122 stops working, the merge engine may pass only A packets, for example by sending only A packets through memory block 312a.

In FIG. 3B, signal S is sent 120 to master transmitter B 122 which forwards packets to receiver B 222 via path B 123. Signal S is also sent 110 to transmitter A. A link 1360 provides intertransmitter communications for overwriting packet A headers with packet B information. This means packets traveling along path A 113 will have a payload copied from packet B and a header that indicates transmitter A created the packets.

A link 1362 provides intertransmitter communications for synchronizing the sequence numbers of corresponding packets. This link provides that packets created by transmitter A 112 will be ready for use should transmitter A become the master.

Receiver A 212 and receiver B 222 receive packets from path A 113 and from path B 123 respectively. Because corresponding packets may be received at different times by receivers A and B, for example due to path length differences, the receivers are equipped with buffers A 212a and B 222 b that enable alignment of corresponding packets in time.

Aligned packets A and B are transferred over respective links 213 and 223 and are inputs to a merge engine 312. In the merge engine, packets that include a faithful reproduction of the payload are selected for merge engine output such that a single reproduction of each payload is output.

A merge engine memory block 312a may be used in the merge process. Here, the merge engine 312 receives packets or facsimiles thereof from receivers A 212 and B 222. In the merge engine, corresponding packets may be merged when one packet is written to the memory block and the other packet overwrites this memory block. For example, packets created by the master transmitter may be the overwriting or the overwritten packets. Output 313 from the memory block 312a is therefore a merger of the output 213, 223 of the receivers 212, 222.

In a case where one of the receiver outputs 213, 223 is not a faithful reproduction of the payload S or payload portion, it may be a faulty packet. In cases, one or both of a packet with a faulty payload or an otherwise faulty packet may be a bad packet. Bad packets are not merged. Rather, the bad packet may be skipped. Where a packet is skipped, the sequence number may be used to maintain proper alignment of corresponding packets.

In some cases where there is failure of one or both of the intercommunications links 196, 198 (see FIG. 1) between transmitters, both transmitters A 112 and B 122 may work as master transmitters. Notably, these transmitters feed respective receivers 212, 222 non-coherent data streams 113, 123. Here, the merge engine 312 must work in a select mode to pass either the transmitter A stream or the transmitter B stream.

In some embodiments, the SSRC field of the RTP header provides the merge engine the ability to determine the merge mode. In some embodiments, the SSRC field of the RTP header provides the merge engine with a merge mode or select mode indicator. For example, where the SSRC field from transmitter A 112 matches the SSRC field from transmitter B 122, the merge engine 312 uses a merge mode. For example, where the SSRC field from transmitter A does not match the SSRC field from transmitter B, the merge engine uses a select mode.

In some cases one or both of the intercommunications links 1352/1362, 1350/1360 or link functions are lost. Where synchronization of sequence numbers via links 1352/1362 is lost, transmitter A 112 may not be ready to take over mastering from transmitter B 122. If transmitter A is not ready to take over mastering from transmitter B, the merge engine 312 may pay pass only B packets, for example by sending only B packets through memory block 312a.

And where header overwrite of B packets via links 1350/1360 is lost, transmitter A 112 may stop working. If transmitter A stops working, the merge engine may pass only B packets, for example by sending only B packets through memory block 312a.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A redundant transmission system utilizing Real-Time Transport Protocol comprising:
   in transmitter A, packet creator A receiving signal S and sending packets to selector A;
   in transmitter B, packet creator B receiving signal S and sending packets to selector B;
   selector A and B outputs connected to respective paths A and B;
   if the transmitters are communicating then sequence numbers of A and B packets of respective transmitters A and B are synchronized via copying;
   in one of the transmitters, the one selector passing packets created by the one transmitter to one selector;
   in the other of the transmitters, the other selector passing packets from the one transmitter after they are modified to the other selector; and wherein signals received on respective paths A and B are merged after faulty packets are removed, the merger of corresponding non-faulty packets resulting in a first non-faulty packet overwriting a second non-faulty packet.

2. The redundant transmission system of claim 1 wherein: if the transmitters are communicating then a faulty packet causes the one transmitter to become the other transmitter; and, the faulty packet causes the other transmitter to become the one transmitter.

3. The redundant transmission system of claim 2 further comprising:
   if the transmitters are communicating then transmitter A working as the master transmitter and transmitter B working as the slave transmitter:
   a payload, RTP header, and IP+MAC header in the packets sent to selector A;
   transmitter A packets transported over path A; and,
   path B transporting modified A packets with packet A payloads, the modified A packets having their IP and MAC headers overwritten with packet B IP and MAC headers.

4. The redundant transmission system of claim 3 further comprising:
   if the transmitters are communicating then a transmitter B RTP sequence number synchronizer receiving a sequence number from an A packet;
   a B packet corresponding to the A packet adopting the A packet sequence number; and,
   transmitter B packets ready for transport on path B in the event that transmitter B becomes the master transmitter.

\* \* \* \* \*